US012781083B2

(12) United States Patent
Okawa et al.

(10) Patent No.: US 12,781,083 B2
(45) Date of Patent: *Nov. 3, 2026

(54) PRIMER, PRINTING SET, PRINTING METHOD, AND PRINTING DEVICE

(71) Applicant: Ricoh Company, Ltd., Tokyo (JP)

(72) Inventors: Mizuki Okawa, Kanagawa (JP); Tomohiro Nakagawa, Kanagawa (JP); Yuta Nakamura, Tokyo (JP); Hikaru Ishii, Kanagawa (JP); Daiki Hyakutake, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 18/607,004

(22) Filed: Mar. 15, 2024

(65) Prior Publication Data

US 2024/0309235 A1 Sep. 19, 2024

(30) Foreign Application Priority Data

Mar. 15, 2023 (JP) ................................ 2023-041125
Feb. 28, 2024 (JP) ................................ 2024-028771

(51) Int. Cl.

| | |
|---|---|
| ***C09D 11/54*** | (2014.01) |
| ***B41J 2/01*** | (2006.01) |
| ***B41J 2/21*** | (2006.01) |
| ***B41M 5/00*** | (2006.01) |
| ***C09D 11/033*** | (2014.01) |
| ***C09D 11/102*** | (2014.01) |
| ***C09D 11/322*** | (2014.01) |
| ***C09D 11/38*** | (2014.01) |
| ***C09D 11/40*** | (2014.01) |

(52) U.S. Cl.

CPC ................ *C09D 11/54* (2013.01); *B41J 2/01* (2013.01); *B41J 2/2107* (2013.01); *B41J 2/2114* (2013.01); *B41M 5/0017* (2013.01); *C09D 11/033* (2013.01); *C09D 11/102* (2013.01); *C09D 11/322* (2013.01); *C09D 11/38* (2013.01); *C09D 11/40* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2011/0102497 | A1* | 5/2011 | Sato ....................... | C09D 11/30 252/8.81 |
| 2015/0258833 | A1* | 9/2015 | Katsuragi ............ | C09D 11/322 524/388 |
| 2017/0088739 | A1* | 3/2017 | Yamashita ............... | B41M 5/52 |
| 2018/0170061 | A1 | 6/2018 | Nakamura et al. | |
| 2018/0208783 | A1 | 7/2018 | Takahashi et al. | |
| 2019/0092956 | A1 | 3/2019 | Imanaga et al. | |
| 2019/0168516 | A1 | 6/2019 | Nakagawa et al. | |
| 2019/0270900 | A1 | 9/2019 | Nakamura et al. | |
| 2019/0283406 | A1 | 9/2019 | Fujita et al. | |
| 2019/0284421 | A1 | 9/2019 | Sekiguchi et al. | |

(Continued)

FOREIGN PATENT DOCUMENTS

| | | |
|---|---|---|
| JP | 2000-301826 A | 10/2000 |
| JP | 2019-064250 A | 4/2019 |

(Continued)

OTHER PUBLICATIONS

U.S. Appl. No. 18/472,679, Mayumi Yoshihara, filed Sep. 22, 2023.

*Primary Examiner* — Manish S Shah

(74) *Attorney, Agent, or Firm* — XSENSUS LLP

(57) ABSTRACT

A primer may comprise water, a cationic resin, a polyvalent metal salt, and adiethylene glycol alkyl ether compound. A dry solid film of the primer may have a breaking energy of 20 mJ or more and 1,000 mJ or less and a breaking elongation of 500% or more and 2,500% or less, which are measured by a tensile tester having a tensile speed of 150 mm/min.

13 Claims, 1 Drawing Sheet

(56) References Cited

U.S. PATENT DOCUMENTS

| | | | |
|---|---|---|---|
| 2019/0345356 | A1 | 11/2019 | Kido et al. |
| 2019/0389231 | A1 | 12/2019 | Kaji et al. |
| 2020/0095444 | A1 | 3/2020 | Hagiwara et al. |
| 2020/0102467 | A1 | 4/2020 | Nakamura et al. |
| 2020/0115579 | A1 | 4/2020 | Kido et al. |
| 2020/0262228 | A1 | 8/2020 | Hagiwara et al. |
| 2020/0299531 | A1 | 9/2020 | Nakamura et al. |
| 2020/0385592 | A1 | 12/2020 | Nakagawa et al. |
| 2020/0399496 | A1 | 12/2020 | Nonaka et al. |
| 2021/0062026 | A1 | 3/2021 | Shimura et al. |
| 2021/0130639 | A1* | 5/2021 | Sugihara .................... B41J 2/01 |
| 2021/0155012 | A1 | 5/2021 | Gotou et al. |
| 2021/0170779 | A1* | 6/2021 | Asakawa ............. C09D 11/033 |
| 2021/0292578 | A1 | 9/2021 | Nakagawa et al. |
| 2022/0024217 | A1 | 1/2022 | Sakaguchi et al. |
| 2022/0056298 | A1 | 2/2022 | Umemura et al. |
| 2022/0056299 | A1 | 2/2022 | Yamamoto et al. |
| 2022/0169034 | A1 | 6/2022 | Hagiwara et al. |
| 2022/0177718 | A1 | 6/2022 | Umemura et al. |
| 2023/0088754 | A1 | 3/2023 | Ishii et al. |
| 2023/0183410 | A1 | 6/2023 | Ishii et al. |
| 2023/0183501 | A1 | 6/2023 | Hasegawa et al. |
| 2023/0183508 | A1 | 6/2023 | Fujita et al. |
| 2023/0183520 | A1 | 6/2023 | Fujita et al. |
| 2023/0193068 | A1* | 6/2023 | Sato ..................... C09D 11/322 347/95 |
| 2023/0220226 | A1 | 7/2023 | Hagiwara et al. |
| 2023/0331000 | A1 | 10/2023 | Yamamoto et al. |
| 2023/0332009 | A1 | 10/2023 | Fujita et al. |
| 2024/0010844 | A1 | 1/2024 | Hasebe et al. |

FOREIGN PATENT DOCUMENTS

| | | | |
|---|---|---|---|
| JP | 2019-094377 | A | 6/2019 |
| JP | 2019-136997 | A | 8/2019 |
| JP | 2019-214200 | A | 12/2019 |
| JP | 2020-019270 | A | 2/2020 |
| JP | 2021-000790 | A | 1/2021 |
| JP | 6977036 | B2 | 12/2021 |
| JP | 6982185 | B2 | 12/2021 |
| JP | 2022-034514 | A | 3/2022 |
| JP | 7156430 | B2 | 10/2022 |
| WO | 2020/049929 | A1 | 3/2020 |

* cited by examiner

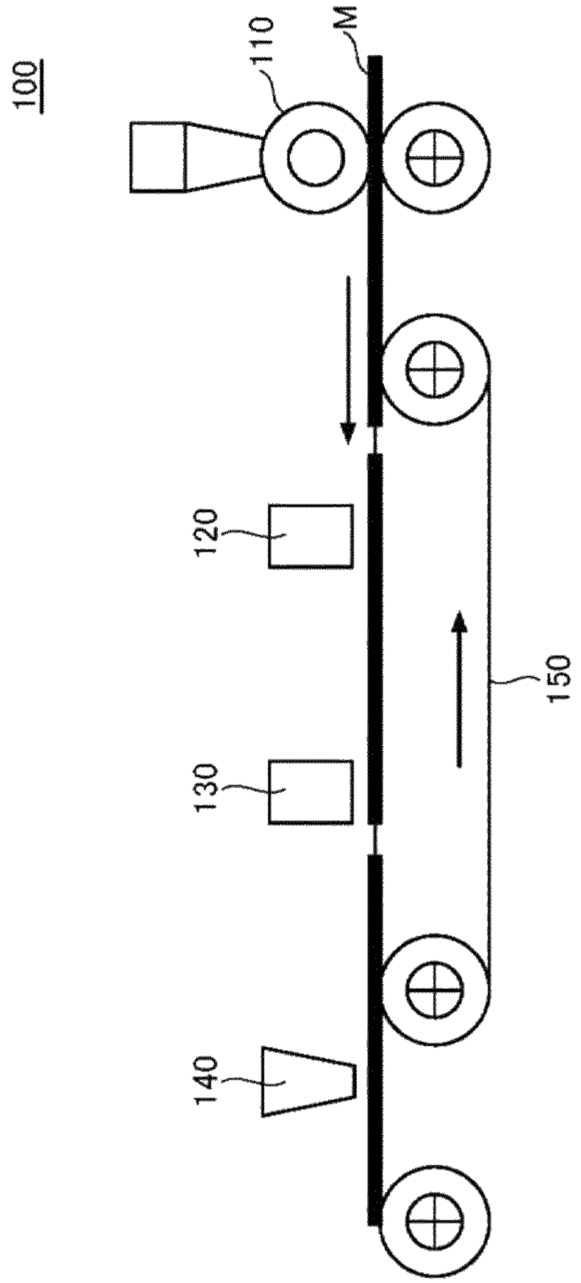
100
110
M
120
130
140
150

PRIMER, PRINTING SET, PRINTING METHOD, AND PRINTING DEVICE

CROSS-REFERENCE TO RELATED APPLICATIONS

The present application claims priority under 35 U.S.C. § 119 to Japanese Patent Application No. 2023-041125, filed Mar. 15, 2023 and Japanese Patent Application No. 2024-028771, filed Feb. 28, 2024. The contents of each are incorporated herein by reference in their entirety.

BACKGROUND

Technical Field

The present disclosure relates to a primer, a printing set, a printing method, and a printing apparatus.

In recent years, as the printer speed increases, it is anticipated that deterioration in image quality such as image unevenness will become a problem due to occurrence of beading caused by insufficient drying of ink.

For example, a liquid composition for surface treatment of a recording medium containing nonionic resin particles and polyvalent metal salts has been proposed in Japanese Unexamined Patent Application Publication No. 2021-000790.

In addition, a reaction solution comprising one or more kinds of organic solvents from esters, alkylene glycol ethers, cyclic esters, and alkoxyalkyl amides, and a aggregating agent which aggregates components of an ink composition, wherein the reaction solution is used for a recording method performed by using the ink composition, has been proposed in Japanese Unexamined Patent Application Publication No. 2021-120219.

SUMMARY

The primer according to one embodiment of the present disclosure comprises water, a cationic resin, a polyvalent metal salt, and a diethylene glycol alkyl ether compound. A dry solid film of the primer has a breaking energy of 20 mJ or more and 1,000 mJ or less and a breaking elongation of 500% or more and 2,500% or less, which are measured by a tensile tester having a tensile speed of 150 mm/min.

BRIEF DESCRIPTION OF THE DRAWINGS

FIGURE is a schematic diagram showing an example of a printing device according to one embodiment of the present disclosure.

DESCRIPTION OF THE EMBODIMENTS

Primer

The primer according to one embodiment of the present disclosure includes water, a cationic resin, a polyvalent metal salt, and a diethylene glycol alkyl ether compound, optionally a surfactant and/or other ingredients.

In the present disclosure, a "primer," a "treatment liquid," "pretreatment liquid," "composition," "reaction liquid," or "liquid composition" are interchangeable.

The liquid composition for surface treatment of JP2021-000790A1 contains nonionic resin particles and does not contain diethylene glycol alkyl ether compounds. In addition, the reaction solution of JP2021-120219A1 does not use both a diethylene glycol alkyl ether compound and a cationic resin. Accordingly, in the prior arts, the occurrence of the beading cannot be suppressed, the glossiness of the image is reduced, and the adhesion between the different types of recording media and the image cannot be improved.

In one embodiment of the present disclosure, a dry solid film formed from the primer has a breaking energy of 20 mJ or more and 1,000 mJ or less and a breaking elongation of 500% or more and 2,500% or less measured as follows, wherein the dry solid film is obtained by adding 6 g of the primer in a Teflon® petri dish having a diameter of 50 mm and drying it in a hot-air circulation-type thermostat at 40° C. for one day, followed in a hot-air circulation-type thermostat at 70° C. for three days. Optionally, the breaking energy of the dry solid film is 100 mJ or more and 500 mJ or less. Optionally, the breaking elongation of the dry solid film is 500% or more and 1,000% or less.

<Measurement of Breaking Energy and Breaking Elongation>

A sample cut with a cutter into the size of 5 mm×50 mm is subjected to a tensile test under the following conditions to determine the breaking energy and breaking elongation.

Conditions

- Device: Autograph AG-10N manufactured by Shimadzu Corporation
- Load cell: 5 kN
- Tensile speed: 150 mm/min.
- Distance between chucks: 4 mm
- Sample width: 5 mm In some embodiments of the present disclosure, since the breaking energy of the dry solid film of the primer is 20 mJ or more and 1,000 mJ or less and the breaking elongation thereof is 500% or more and 2,500% or less, the occurrence of the beading can be suppressed, an image having an excellent glossiness can be formed, and adhesion of the recording medium and the image of different types can be improved.

Optionally, the cationic resin included in the primer has a high polarity monomer in the resin backbone in order to increase the adhesion energy between the image and the recording medium of the different types. In one embodiment, the number average molecular weight of the cationic resin is 10,000 or more and 200,000 or less because the image is resistant to cracking when a different type of recording medium is used and the image follows the recording medium. Optionally, the cationic resin includes γ monomer having a rigid backbone such as a phenyl group. Further, a resin having a low glass transition temperature, a low elastic modulus, or a high break elongation may be selected in order to improve the flexibility of the primer layer and increase the adhesion between the different types of recording media and the image. By using such a cationic resin, the breaking energy and breaking elongation of the dry solids film of the primer can be adjusted to a range in which the breaking energy is 20 mJ or more and 1,000 mJ or less and the breaking elongation is 500% or more and 2,500% or less.

The individual ingredient in the primer is discussed in detail below:

Water

Examples of water include ion exchange water, ultrafiltration water, reverse osmosis water, purified water such as distilled water, or ultrapure water.

The amount of water in the primer is not particularly limited and can be appropriately selected depending on the purpose. In one embodiment, from the viewpoint of drying and discharge reliability of the primer, the amount of water in the primer may be from 10% to 80% by weight, and optionally from 30% to 60% by weight.

Diethylene Glycol Alkyl Ether Compound

The diethylene glycol alkyl ether compound may be used as an organic solvent.

Examples of the diethylene glycol alkyl ether compound include, but not limited to, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, diethylene glycol dimethyl ether, diethylene glycol diethyl ether, diethylene glycol dibutyl ether, diethylene glycol ethyl methyl ether, diethylene glycol isopropyl methyl ether, diethylene glycol butyl methyl ether, or the like. They may be used alone or in combination with two or more species. In one embodiment, diethylene glycol diethyl ether is preferable from the viewpoint of the gloss of the image and the adhesion of the image to a different type of recording medium.

The content of the diethylene glycol alkyl ether compound may be 5 wt % or more and 30 wt % or less based on a total weight of the primer, and optionally, the content is 15 wt % or more and 30 wt % or less based on the total weight of the primer. If the content of the diethylene glycol alkyl ether compound is 5 wt % or more and 30 wt % or less based on the total weight of the primer, an image having an excellent gloss can be formed, and adhesion between the image and different types of recording medium may be improved.

In addition to the diethylene glycol alkyl ether compound, the primer according to some embodiments the present disclosure may include other organic solvents.

Other organic solvents include, for example, polyhydric alcohols, ethers such as polyhydric alcohol alkyl ethers and polyhydric alcohol aryl ethers, nitrogen-containing heterocycles, amides, amines, sulfur-containing compounds, or the like.

Examples of such other organic solvents include polyhydric alcohols such as ethylene glycol, diethylene glycol, propylene glycol, 1,2-propanediol, 1,3-propanediol, 1,2-butanediol, 1,3-butanediol, 1,4-butanediol, 2,3-butanediol, 3-methyl-1,3-butanediol, 3-methoxy 3-methyl-1-butanol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol. 1,5-hexanediol, glycerin, 1,2,6-hexanetriol, 2-ethyl-1,3-hexanediol, ethyl-1, 2,4-butanetriol, 1,2,3-butanetriol, 2,2,4-trimethyl-1,3-pentanediol, petriol; polyhydric alcohol alkyl ethers such as ethylene glycol monobutyl ether, ethylene glycol monobutyl ether, tetraethylene glycol monomethyl ether, propylene glycol monoethyl ether; polyhydric alcohol aryl ethers such as ethylene glycol monophenyl ether, ethylene glycol monobenzyl ether; nitrogen-containing heterocycles such as 2-pyrrolidone, N-methyl-2-pyrrolidone N-hydroxyethyl-2-pyrrolidone, 1,3-dimethyl-2-imidazolidinone, ε-caprolactam, γ-butyrolactone; amides such as formamide, N-methylformamide, N,N-dimethylformamide, 3-methoxy-N,N-dimethylpropionamide and 3-butoxy-N,N-dimethylpropionamide; amines such as monoethanolamine, diethanolamine, triethylamine; sulfur-containing compounds such as dimethyl sulfoxide, sulfolane, thiodiethanol; propylene carbonate, ethylene carbonate, or the like. They may be used alone or in combination with two or more species.

The content of the organic solvent including the diethylene glycol alkyl ether compound is not particularly limited, and can be appropriately selected depending on the purpose.

In one embodiment, the content of the organic solvent is from 10% to 60% by weight based on a total weight of the primer, and optionally the content of the organic solvent is 20% to 60% by weight based on a total weight of the primer.

Polyvalent Metal Salt

The polyvalent metal salt may bind to bivalent or higher polyvalent metal ions. The polyvalent metal salt is optionally composed of carboxylate ions or nitrate ions and is soluble in water.

In one embodiment, as the carboxylic acid in the carboxylate ion, saturated aliphatic monocarboxylic acid may be used. Saturated aliphatic monocarboxylic acids include, for example, formic acid, acetic acid, propionic acid, butyric acid, isobutyric acid, valeric acid, isovaleric acid, pivalic acid, hexanoic acid, or the like. They may be used alone or in combination with two or more species.

Examples of the polyvalent metal ions may include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$.

Examples of the polyvalent metal salt include, for example, calcium carbonate, calcium nitrate, calcium chloride, calcium acetate, calcium sulfate, magnesium chloride, magnesium acetate, magnesium nitrate, magnesium sulfate, barium sulfate, zinc sulfide, zinc carbonate, aluminum chloride, aluminum nitrate, or hydrates thereof. Among them, in one embodiment, magnesium acetate or its hydrate may be selected from the viewpoint of the gloss of the image and the adhesion between the image and the recording medium of a different type.

The content of the polyvalent metal salt may be 0.25% or more and 10% or less by weight, and optionally 0.5% or more and 5% or less by weight, based on the total amount of primer.

Cationic Resin

The resin used in the primer optionally has a high polarity monomer in the resin backbone in order to increase the adhesion energy between the image and the recording medium, thereby increasing the adhesion. In one embodiment, a resin having a low glass transition temperature, a low elastic modulus, or a high break elongation may be used in order to improve the flexibility of the primer layer and increase the adhesion between the recording medium and the image of different types. Among these resins, a cationic resin may be used in terms of image glossiness and adhesion between different types of recording medium and images.

The cationic resin may be a resin having a cationic substituent, for example, a cationic urethane resin, a cationic olefin resin, a cationic allylamine resin, or the like. In one embodiment, cationic polyurethane resin may be selected from the viewpoint of the gloss of the image and the adhesion between the image and the recording medium of a different type.

Examples of the cationic resin may include the commercially available resin such as Hydrane CP-7010, CP-7020, CP-7030, CP-7040, CP-7050, CP-7060, or CP-7610 (all of which are manufactured by DIC Corporation); aqueous urethane dispersion WBR-2120C; WBR-2122C (all of which are manufactured by Taisei Fine Chemical Co., Ltd.); or the like.

The cationic resin in the form of a cationic resin emulsion dispersed in water may be mixed with a material such as an organic solvent to obtain the primer. For the ease of preparing the primer by blending the resin particles in the organic solvents and water as uniformly as possible, etc., the resin particles may be added in a state of resin emulsion, in which the resin particles are stably dispersed as a dispersant in water.

The cationic resin may form a film readily by dissolving it in an organic solvent added to the primer. More specifically, the formation of a film of resin particles is promoted along with the evaporation of the organic solvent and water contained in the primer.

To disperse the cationic resin as a dispersant with water, examples of the resin particles include forced emulsifying resin particles with a dispersing agent and self-emulsifying resin particles having a cationic group in a molecular structure of the cationic resin. Among these, in one embodiment, the self-emulsifying resin particles having cationic groups in the molecular structure of the cationic resin are selected in order to increase the strength of the printed matter.

The number average molecular weight of the cationic resin may be 10,000 or more and 200,000 or less from the viewpoint of adhesion of the image to the different types of recording medium. The number average molecular weight of the cationic resin can be determined, for example, by gel permeation chromatography (GPC).

The content of the cationic resin may be 2 wt % to more and 15 wt % or less of the total weight of the primer.

Surfactant

The surfactant may be a compound having a hydrophilic group or hydrophilic polymer chain as a side chain of the compound having a polysiloxane structure such as polydimethylsiloxane (silicone compound), a compound having a hydrophilic group or hydrophilic polymer chain at an end of the compound having a polysiloxane structure such as polydimethylsiloxane (silicone compound), or the like. The term "the compound having the polysiloxane structure" means the compound having the polysiloxane structure as a main chain, which includes a polysiloxane surfactant.

Examples of the hydrophilic group or the hydrophilic polymer chain include polyether groups (polyethylene oxide, polypropylene oxide, or copolymers thereof, etc.), polyglycerol ($C_3H_6O(CH_2CH(OH)CH_2O)n$-H, etc.), pyrrolidone, betaine ($C_3H_6N+(C_2H_4)_2—CH_2COO^-$, etc.), sulfate ($C_3H_6O(C_2H_4O)n$-$SO_3Na$, etc.), phosphate ($C_3H_6O(C_2H_4O)n$-P(=O)OHONa, etc.), quaternary salt ($C_3H_6N+(C_2H_4)_3Cl^-$), or the like. Wherein n is an integer equal to or larger than 1 in the formula. Among these, in one embodiment, the polyether group is preferred.

In addition, vinyl-based copolymer is also preferable which has a silicone-based compound chain such as polydimethylsiloxane in its side chain, which is obtained by copolymerization of a polydimethylsiloxane having a polymerizable vinyl group at its distal end and a copolymerizable monomer (it is preferable to at least partially use a hydrophilic monomer such as a (meth)acrylic acid or its salt in the monomer).

Among them, those having a polysiloxane structure and a hydrophilic polymer chain may be selected, and optionally those having the polyether group as the hydrophilic polymer chain. Non-ionic surfactants based on polysiloxane surfactant having methyl polysiloxane as the hydrophobic group and polyoxyethylene structure as the hydrophilic group are particularly preferred.

Examples of polysiloxane surfactants include polyether modified silicones and silicone compounds containing polyoxyalkylene groups.

As the polysiloxane surfactant, a commercially available product can be used, and the commercially available product includes, for example, silface SAG503A, silface SAG005, silface SAG008 (all of which are manufactured by Nissin Chemical Industries, Ltd.); FZ2110, FZ2166, SH-3772M, L7001, SH-3773M (all of which are manufactured by Toray Dow Co., Ltd.); KF-353, KF-945, KF-6017 (all of which are manufactured by Shin-Etsu Chemical Industries, Ltd.); Form Ban MS-575 (manufactured by Ultra Adives Inc.), or the like. They may be used alone or in combination with two or more species.

In one embodiment, the content of the surfactant is 0.1% or more and 4% or less by weight, and optionally, 1% or more and 2% or less by weight of the total weight of primer. When the above-described content is 0.1 wt % or more and 4 wt % or less, adhesion of the image to different types of recording medium can be improved by combining the surfactant and the diethylene glycol alkyl ether compound, and image quality such as glossiness can be further improved.

The mass ratio (surfactant:cationic resin) of the surfactant and the cationic resin may be from 1:4 to 1:20 in terms of the glossiness of the image and the adhesion of the image to a different type of recording medium, and optionally from 1:5 to 1:10.

Other Ingredients

Other ingredients may include antimolder, defoamer, antiseptic/fungicide, anti-rust agent, and pH adjuster which are not particularly limited and can be appropriately selected depending on the purpose.

Defoamer

Examples of defoamers include silicone-based defoamers, polyether-based defoamers, fatty acid ester-based defoamers, or the like. They may be used alone or in combination with two or more species. In one embodiment, silicone-based defoamers may be used from the point of excellent foam breaking effect.

Antiseptic/Fungicide

There is no particular limitation as an antiseptic/fungicide, which may include, for example, 1,2-benzisothiazoline-3-one.

Anti-Rust Agent

As the anti-rust agent, there is no particular limitation, which may include, for example, acid sulfite, sodium thiosulfate, or the like.

pH Adjuster

The pH adjuster includes amines such as diethanolamine, triethanolamine or the like without limitation, provided that the pH can be adjusted to 7 or more.

The primer according to one embodiment of the present disclosure can be prepared by mixing water, a cationic resin, a polyvalent metal salt, a diethylene glycol alkyl ether compounds, and a surfactant, optionally with other ingredients, with agitation and mixing as necessary. Agitation and mixing can be performed, for example, by a stirrer having a stirring blade, a magnetic stirrer, a high speed disperser, or the like.

Physical Property of the Primer

As for the physical property of the primer, there is no particular limitation, and it is possible to appropriately select the physical property of the primer according to the purpose. For example, the surface free energy γ, the viscosity, the pH, or the like of the primer may be in the following range.

The surface free energy γ at 25° C. of the primer may be 45 $mJ/m^2$ or less and more optionally 40 $mJ/m^2$ or less in view of the adhesion between the different types of recording medium and the image.

The surface free energy γ can be measured with a FAMAS automatic contact angle meter (manufactured by Kyowa Interface Chemical Co., Ltd., DMO-501) at 25° C. using polyvinyl chloride (GIY-11Z5, manufactured by Lintec Co., Ltd.) as the recording medium, and Zisman plots can be made to determine the surface tension $\gamma_c$ (critical surface tension) when cos θ=1 (θ=0), that is, the surface free energy ($mJ/m^2$).

The viscosity of the primer at 25° C. may be 5 mPa·s or more and 20 mPa·s or less, and optionally 5 mPa·s or more and 15 mPa·s or less, in order to obtain good discharge performance.

In this case, for example, a rotary viscometer (manufactured by Toko Sangyo Co., Ltd., RE-550L) can be used to measure the viscosity.

Measurement conditions are as follows: standard cone rotor (1°34'×R24), 1.2 mL sample volume, 50 rpm, 3 minutes at 25° C.

As for the pH of the primer, in one embodiment, the pH may be from 7 to 12, and optionally from 8 to 11 from the viewpoint of preventing corrosion of the wetted metal member.

Qualitative and quantitative measurement of the diethylene glycol alkyl ether compound, the cationic resin, the polyvalent metal salt, the surfactant, and other components contained in the primer of the present disclosure include, for example, gas chromatography/mass spectrometry (GC-MS) or the like. Examples of measuring devices by gas chromatography/mass spectrometry (GC-MS) include GCMS-QP2020NX (Shimadzu Corporation). In addition, water contained in the primer can be measured using a general method by determination of volatile components by gas chromatography/mass spectrometry (GC-MS) or mass variation by thermogravimetric/differential heat simultaneous measurement (TG-DTA).

Printing Set

A printing set according to one embodiment of the present disclosure includes a primer according to one embodiment of the present disclosure and an ink comprising a colorant and an organic solvent.

The printing set of the present disclosure can be suitably used in a variety of ink jet printing systems, such as printers, facsimile machines, copying machines, printer/fax/multi-function peripheral machines, stereo forming machines, or the like.

Ink

Ink may include a colorant and an organic solvent, optionally water, a resin, an additive, and optionally other ingredients. The individual components in the ink are discussed in detail below.

Organic Solvent

As the organic solvent, there is no particular limitation, and a water-soluble organic solvent may be used. Examples of the organic solvent include polyhydric alcohols, ethers such as poly hydric alcohol alkyl ethers and polyhydric alcohol aryl ethers, nitrogen-containing heterocycles, amides, amines, sulfur-containing compounds, or the like.

Examples of polyhydric alcohols include ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, 1,5-hexanediol, glycerine, 1,2,6-hexanetriol 2-Ethyl-1,3-hexanediol, ethyl-1,2,4-butanetriol, 2,2,4-trimethyl-1,3-pentanediol, and petriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, or the like.

Examples of polyhydric alcohol aryl ethers include ethylene glycol monophenyl ether, ethylene glycol monobenzyl ether, or the like.

Examples of nitrogen-containing heterocycles include 2-pyrrolidone, N-methyl-2-pyrrolidone, N-hydroxyethyl-2-pyrrolidone, 1,3-dimethyl-2-imidazolidinone, ε-caprolactam, γ-butyrolactone, or the like.

Examples of amides include formamide, N-methylformamide, N,N-dimethylformamide, 3-methoxy-N,N-dimethylpropionamide, 3-butoxy-N,N-dimethylpropionamide, or the like.

Examples of amines include monoethanolamine, diethanolamine, triethylamine, or the like.

Examples of sulfur-containing compounds include dimethyl sulfoxide, sulfolane, thioethanol, or the like.

Other organic solvents include propylene carbonate, ethylene carbonate, or the like.

Since it not only functions as a wetting agent but also provides good drying properties, in one embodiment, an organic solvent having a boiling point of 250° C. or less is used.

As an organic solvent, a polyol compound having 8 carbons or more and a glycol ether compound may be used. The polyol compounds having 8 carbons or more and the glycol ether compound can improve ink permeability when paper is used as the recording medium.

Examples of polyol compounds having 8 or more carbons include 2-ethyl-1,3-hexanediol, 2,2,4-trimethyl-1,3-pentanediol or the like.

Examples of glycol ether compounds include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, or the like; polyhydric alcohol aryl ethers such as ethylene glycol monophenyl ether, ethylene glycol monobenzyl ether, or the like.

The content of the organic solvent is not particularly limited, and can be appropriately selected depending on the purpose. However, in one embodiment, from the viewpoint of drying and discharge reliability of the ink, the content of the organic solvent may be 10% or more and 60% or less by weight, optionally 20% or more and 60% or less, based on the total weight of the ink.

Colorant

As the colorant, there is no particular limitation, and the colorant can be appropriately selected depending on the purpose, for example, a pigment, a pigment dispersion, a dye, or the like can be used.

Pigment

As pigments, inorganic or organic pigments can be used. They may be used alone or in combination with two or more. Mixed crystals may also be used as pigments.

Examples of pigments include black pigments, yellow pigments, magenta pigments, cyan pigments, white pigments, green pigments, orange pigments, glossy pigments such as gold or silver, and metallic pigments.

As the inorganic pigment, for example, titanium oxide, iron oxide, calcium carbonate, barium sulfate, aluminum hydroxide, barium yellow, cadmium red, chromium yellow, as well as carbon black produced by known methods such as contact method, furnace method, thermal method, or the like can be used.

Examples of the organic pigments include azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments, etc.), dye chelates (e.g., basic dye chelates, acid dye chelates, etc.), nitropigments, nitroso pigments, aniline black, or the like.

Among these pigments, those having good affinity with solvents such as organic solvents and water may be used. In addition, organic hollow particles or inorganic hollow particles may be used.

Examples of pigments for black include carbon black (C.I. Pigment Black 7) such as furnace black, lamp black, acetylene black, channel black, and metals such as copper, iron (C.I. Pigment Black 11), titanium oxide, and organic pigments such as aniline black (C.I. Pigment Black 1).

Examples of pigments for color include C.I. pigment yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, 213; C.I. pigment orange 5, 13, 16, 17, 36, 43, 51; C.I. pigment red 1, 2, 3, 5, 17, 22, 23, 31, 38, 48, 48:2 (permanent red 2B (Ca)), 48, 3, 48, 4, 1, 52, 53, 1, 57:1 (brilliant carmine 6B), 60:1, 63:1.63:2, 64:1, 81, 83, 88, 101, 104, 105, 106, 108 (cadmium red), 112, 114, 122 (quinacridone magenta), Examples include: 123, 146, 149, 166, 168, 170, 172, 177, 178, 179, 184, 185, 190, 193, 202, 207, 208, 209, 213, 219, 224, 254, 264; C.I. pigment violet 1 (rhodamine lake), 3, 5:1, 16, 19, 23, 38; C.I. pigment blue 1, 2, 15 (phthalocyanine blue), 15:1, 15:2, 15:3, 15:4 (phthalocyanine blue), 16, 17:1, 56, 60, 63; C.I. pigment green 1, 4, 7, 8, 10, 17, 18, 36, or the like.

Pigment Dispersion

Pigment dispersions may be obtained by mixing water, an organic solvent, a pigment, and a pigment dispersant, as well as other ingredients as desired.

Examples of the method of dispersing the pigment to prepare the pigment dispersion include the method of mixing the pigment with a material such as water or an organic solvent.

For dispersion, a dispersor may be used.

In addition, the pigment dispersion may be filtered through a filter or centrifugal separator, and degassed, if necessary.

The particle diameter of the pigment in the pigment dispersion has no particular limit. For example, the particle diameter having the maximum frequency is preferably from 20 to 500 nm and more preferably from 20 to 150 nm in the maximum number conversion to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

As the content of the pigment in the pigment dispersion, there is no particular limit, and the pigment can be appropriately selected according to the purpose. In one embodiment, from the viewpoint of obtaining good discharge stability and increasing the image density, the content of the pigment may be 0.1% or more and 60% or less by mass, and optionally 0.1% or more and 50% or less by mass, based on a total mass of the pigment dispersion.

Dyes

The dyes are not particularly limited and may be optionally selected depending on the purpose, such as acid dyes, direct dyes, reactive dyes, basic dyes, or the like. They may be used alone or in combination with two or more.

Examples of dyes include, for example, C.I. acid yellow 17, 23, 42, 44, 79, 142; C.I. acid red 52, 80, 82, 249, 254, 289; C.I. acid blue 9, 45, 249; C.I. acid black 1, 2, 24, 94; C.I. food black 1, 2; C.I. direct yellow 1, 12, 24, 33, 50, 55, 58, 86, 132, 142, 144, 173; C.I. direct red 1, 4, 80, 81, 225, 227; C.I. direct blue 1, 2, 15, 71, 86, 87, 98, 165, 1995, 1992; C.I. direct black 19, 38, 51, 154, 168, 171.195; C.I. Reactive Red 14, 32, 55, 79, 249; C.I. Reactive Black 3, 4, 35, etc.

The content of the colorant is not particularly limited, and can be appropriately selected depending on the purpose. In one embodiment, from the viewpoint of good fixability, color development, and discharge stability, the content of the colorant may be from 0.1% or more and 15% or less by weigh based on the total weight of the ink, and optionally 1% or more and 10% or less by weigh based on the total weight of the ink.

Methods of dispersing the pigment to obtain ink include, for example, introducing a hydrophilic functional group into the pigment to form a self-dispersible pigment, coating the surface of the pigment with a resin to disperse the pigment, dispersing the pigment using a dispersant, or the like.

A method of introducing a hydrophilic functional group to a pigment to form a self-dispersible pigment includes, for example, a method of adding a functional group, such as a sulfone group or a carboxyl group, to a pigment (e.g., carbon), thereby making the pigment dispersible in water.

Methods of coating and dispersing the surface of the pigment with a resin include, for example, a method in which the pigment is included in a microcapsule to be dispersible in water. This can be referred to as a resin-coated pigment. In this case, not all of the pigments formulated in the ink need to be coated with the resin, and the pigment which is not coated with the resin or which is partially coated with the resin may be dispersed in the ink to the extent that the effect of the present disclosure is not impaired.

Methods of dispersing the pigment using a dispersant include, for example, a method of dispersing the pigment using a dispersing agent of a known low molecular weight type, such as a surfactant, or a method of dispersing the pigment using a dispersing agent of a known high molecular weight type.

The dispersing agent is not particularly limited and may be selected depending on the pigment, for example, an anionic surfactant, a cationic surfactant, an amphoteric surfactant, a nonionic surfactant, or the like can be used. They may be used alone or in combination with two or more.

Synthetic dispersants may be used, as appropriate, or commercial products may be used. Examples of commercially available dispersants include New Kargen D-1203 (manufactured by Takemoto Oil & Fat Co., Ltd., a nonionic surfactant) under the trade name. Sodium naphthalene sulfonate formalin condensate may also be suitably used as dispersants.

Water

For example, ion exchange water, ultrafiltration water, reverse osmosis water, distilled water, or ultrapure water may be used.

The content of water is not particularly limited and can be appropriately selected depending on the purpose. In one embodiment, from the viewpoint of the drying and discharge reliability of the ink, the content of water may be 10% or more and 90% or less by weight based on the total weight of the ink, and optionally 20% or more and 60% or less by weight based on the total weight of the ink.

Resin

The type of the resin contained in the ink is not particularly limited and can be appropriately selected depending on the purpose. Examples of the resin include urethane resin, polyester resin, acrylic resin, vinyl acetate resin, styrene resin, butadiene resin, styrene-butadiene resin, vinyl chloride resin, acrylic styrene resin, and acrylic silicone resin. Resin particles formed from these resins may be used.

It is possible to mix resin particles in the form of resin emulsions dispersed in water with materials such as colorants and organic solvents.

Suitable synthetic resin particles may be used, or commercially available resin particles may be used.

The volume average particle diameter of the resin particles is not particularly limited, and can be appropriately selected depending on the purpose. In one embodiment, from the viewpoint of obtaining good fixability and high image hardness, the particle diameter may be 10 nm or more and 1,000 nm or less, and optionally the particle diameter be 10 nm or more and 200 nm or less. It is particularly preferable that the particle diameter be 10 nm or more and 100 nm or less.

The resin content is not particularly limited and may be appropriately selected depending on the purpose. In one embodiment, from the viewpoint of fixability and storage stability of the ink, the resin content may be 1% or more and 30% or less by weight based on the total weight of the ink, and optionally 5% or more and 20% or less by weight based on the total weight of the ink.

The particle size of solids in the ink is not particularly limited and can be appropriately selected depending on the purpose. In one embodiment, from the viewpoint of increasing image quality such as discharge stability and image density, the particle diameter having the maximum frequency may be 20 nm or more and 1,000 nm or less in the maximum number conversion, and optionally 20 nm or more and 150 nm or less.

Solid content includes resin particles and pigment particles. The volume average particle size and the maximum frequency in terms of number of particles can be measured using, for example, a particle size analyzer (Micro Track MODEL UPA340, manufactured by Nikkiso Co., Ltd.).

Additive

The ink may be supplemented, if necessary, with a surfactant, defoamer, antiseptic/fungicide, anti-rust agent, pH adjuster, or the like.

Surfactant

As the surfactant, a silicone-based surfactant, a fluorine-based surfactant, an amphoteric surfactant, a nonionic-based surfactant, or the like can be used.

As a silicone-based surfactant, there is no particular limitation, and the silicone-based surfactant may be selected according to the purpose. Among them, those which do not decompose even at high pH are preferred. Examples of silicone-based surfactants include side chain modified polydimethylsiloxanes, double terminal modified polydimethylsiloxanes, single terminal modified polydimethylsiloxanes, side chain double terminal modified polydimethylsiloxanes, or the like.

Those having a polyoxyethylene group and a polyoxyethylene polyoxypropylene group as the denaturing group are particularly preferred because they exhibit good properties as water-based surfactants. A polyether-modified silicone-based surfactant may also be used as a silicone-based surfactant. For example, a compound in which a polyalkylene oxide structure is introduced into the Si side chain of a dimethylsiloxane is included.

As for the fluorine-based surfactant, for example, a perfluoroalkylsulfonic acid compound, a perfluoroalkylcarboxylic acid compound, a perfluoroalkylphosphate compound, a perfluoroalkylethylene oxide adduct, and a polyoxyalkylene ether polymer compound having a perfluoroalkyl ether group as the side chain is particularly preferred because of its low foaming property. Examples of perfluoroalkylsulfonic compounds include perfluoroalkylsulfonic acids, perfluoroalkylsulfonates or the like. Examples of perfluoroalkylcarboxylic acids include perfluoroalkylcarboxylic acids, perfluoroalkylcarboxylates, or the like. Examples of polyoxyalkylene ether polymer compounds having a perfluoroalkyl ether group as the side chain include sulfate salts of a polyoxyalkylene ether polymer that has a perfluoroalkyl ether group as a side chain, salts of a polyoxyalkylene ether polymer that has a perfluoroalkyl ether group as a side chain, or the like. Examples of counterions of the salts in the fluorinated surfactants include Li, Na, K, $NH_4$, $NH_3CH_2CH_2OH$, $NH_2(CH_2CH_2OH)_2$, $NH(CH_2CH_2OH)_3$, or the like.

Examples of amphoteric surfactants include lauryl aminopropionate, lauryl dimethyl betaine, stearyl dimethyl betaine, lauryl dihydroxyethyl betaine or the like.

Examples of nonionic surfactants include polyoxyethylene alkyl ethers, polyoxyethylene alkyl esters, polyoxyethylene alkyl amines, polyoxyethylene alkyl amides, polyoxyethylene propylene block polymers, sorbitan fatty acid esters, polyoxyethylene sorbitan fatty acid esters, ethylene oxide adducts of acetylene alcohols, or the like.

The content of the surfactant is not particularly limited, and can be appropriately selected according to the purpose. In one embodiment, since the content of the surfactant is excellent in wettability and discharge stability, and image quality is improved, the content of the surfactant may be 0.001% to 5% by weight based on the total weight of the ink, and optionally 0.05% to 5% by weight.

Defoamer

Examples of defoamers include silicone-based defoamers, polyether-based defoamers, fatty acid ester-based defoamers, or the like. They may be used alone or in combination with two or more species. Among these, silicone-based defoamer may be used from the point of excellent foaming effect.

Antiseptic/Fungicide

Antiseptic/fungicide are not particularly limited and can be appropriately selected depending on the purpose, for example, 1,2-benzisothiazoline-3-one or the like.

Anti-Rust Agent

The anti-rust agent is not particularly limited and may be selected according to the purpose, for example, acid sulfite, sodium thiosulfate, or the like.

pH Adjuster

The pH adjuster includes amines such as diethanolamine, triethanolamine or the like without limitation, provided that the pH can be adjusted to 7 or more.

Physical Property of the Ink

As the physical property of the ink, there is no particular limitation, and it is possible to appropriately select the physical property of the ink according to the purpose. In one embodiment, the viscosity, surface tension, or pH may be in the following range.

The viscosity of the ink at 25° C. may be 5 mPa·s or more and 30 mPa·s or less, and optionally 5 mPa·s or more and 25 mPa·s or less. As such, the printing density and the character quality may be improved and good discharge performance may be obtained.

In this case, for example, a rotary viscometer (manufactured by Toko Sangyo Co., Ltd., RE-80L) may be used to measure the viscosity.

Measurement conditions are as follows: standard cone rotor (1°34'×R24), 1.2 mL sample volume, 50 rpm, 3 minutes at 25° C.

The surface tension of the ink may be 35 mN/m or less at 25° C., and optionally 32 mN/m or less. As such, the ink may be levelled on the recording medium and the drying time of the ink may be shortened.

The pH of the ink may be from 7 to 12, and optionally from 8 to 11 from the viewpoint of preventing corrosion of the wetted metal member.

Qualitative or quantitative measurement of the organic solvents, resins, colorants, and other ingredients contained in the ink include, for example, gas chromatography-mass spectrometry (GC-MS). Examples of measuring devices by gas chromatography/mass spectrometry (GC-MS) include GCMS-QP2020NX (Shimadzu Corporation). As a general method, water contained in ink can be measured by determination of volatile components by gas chromatography/mass spectrometry (GC-MS) or mass variation by thermal weight/differential heat simultaneous measurement (TG-DTA).

Printed Matter

The printed matter used in the present disclosure include an image formed on a recording medium using the printing set of the present disclosure. The printed matter of the present disclosure may be printed by the printing apparatus and method on a recording medium.

Recording Medium

As the recording medium, there is no particular limitation. Although a plain paper, glossy paper, special paper, cloth, or the like may be used, it is possible to form a good image even by using a non-permeable recording medium.

As for the non-permeable recording medium, there is a recording medium obtained by using various materials, and the wettability when a primer is applied is different because the material present on the surface is different. According to the present disclosure, it is possible to form a primer layer having good adhesion even when a recording medium having a different wettability is used. The wettability of the recording medium can be evaluated, for example, by measuring the contact angle between the recording medium and the primer, or otherwise confirmed by the method disclosed in JP2012-78190A1.

The term "non-permeable recording medium" refers to a recording medium having a surface with low water permeability and low absorbency, including a material with numerous cavities that do not open to the outside. More quantitatively, the term "non-permeable recording medium" refers to a recording medium having a water absorption of 10 mL/m2 or less from the start of contact to $30^{msec\ 1/2}$ by the Bristow method.

Examples of the non-permeable recording medium include a plastic film such as a vinyl chloride resin film, a polyethylene terephthalate (PET) film, a polypropylene, a polyethylene, a polycarbonate film, or the like.

Examples of polypropylene and polyethylene are: AR1025, AR1056, AR1082, EC1082, 1082D, 1073D, 1056D, 1025D, FR1073 (all of which are manufactured by Asahi Dupont Flash Products Co., Ltd.); P2002, P2102, P2108, P2161, P2171, P2111, P4266, P5767, P3162, P61, P8121, P1162, P11, P1128, P1181, P1153, P1157, P1146, P1147, P1171 (all of which are manufactured by Toyobo Co., Ltd.); YPI, Aqua Yupo, Super Yupo, Ultra Yupo, New Yupo, Yupo Denko, Yupo Buildings Paper, Yupo High Glos, Yupo Jet, Yupo Jet Metallic Yupo (both manufactured by Yupo Corporation) and others are included. They may be used alone or in combination with two or more species.

Printing Method and Printing Equipment

The printing process of the present disclosure includes a primer applying step and an ink applying step, and optionally includes other steps.

The printing apparatus of the present disclosure includes a primer applying means and an ink applying means, and optionally includes other means.

The printing method of the present disclosure can be suitably performed by the printing apparatus of the present disclosure, the primer applying step can be performed by a primer applying means, the ink applying step can be performed by an ink applying means, and the other steps can be performed by other means.

The printing apparatus include a desktop type or wide printing apparatus capable of printing on an A0-size recording medium, such as a journal printer capable of using a roll-up continuous sheet as the recording medium.

Primer Applying Step and Primer Applying Means

The primer applying step is a step of providing a primer of the present disclosure on a recording medium and is performed by the primer applying means.

The method of applying the primer is not particularly limited and may be selected according to the purpose, for example, inkjet printing method, blade coating method, gravure coating method, gravure offset coating method, bar coating method, roll coating method, spray coating method, knife coating method, air knife coating method, comma coating method, U comma coating method, AKKU coating method, smoothing coating method, microgravure coating method, reverse roll coating method, four roll coating method, five roll coating method, dip coating method, curtain coating method, slide coating method, and die coating method. Among these, the inkjet printing method is preferred in that the primer can be uniformly applied throughout the recording medium and the minimum amount can be given by adjusting the droplet size.

If desired, the recording medium with primer may be heated to dry the primer, but may not be heated.

In one embodiment, the amount of the primer applied to the recording medium may be 1 g/m2 or more and 5 g/m2 or less, and optionally, 3 g/m2 or more and 10 g/m2 or less.

Ink Applying Step and Ink Applying Means

The inking step is a step of applying ink containing a colorant and an organic solvent on a recording medium to which a primer is applied, and is performed by an ink applying means.

In the present disclosure, ink is applied after a primer is applied to the recording medium. The ink may be applied before or after drying the primer.

The method of applying ink is not particularly limited and may be selected according to the purpose, for example, inkjet printing method, blade coating method, gravure coating method, gravure offset coating method, bar coating method, roll coating method, knife coating method, air knife coating method, comma coating method, U comma coating method, AKKU coating method, smoothing coating method, microgravure coating method, reverse roll coating method, 4-roll coating method, 5-roll coating method, dip coating method, curtain coating method, slide coating method, die coating method, or the like. Among these, the inkjet printing method may be selected from the viewpoint of maintenance and work efficiency of the equipment.

Other Steps and Other Means

Other means include, but are not limited to, suitable selection depending on the purpose, such as heating means, conveying means, or the like.

Other steps include, but are not limited to, suitable selection depending on the purpose, for example, a heating step, a conveying step, or the like.

Heating Step and Heating Means

Optionally, the printing step of the present disclosure includes a heating step after the ink applying step. Examples of heating means include roll heaters, drum heaters, hot air, hot plates, or the like.

The heating process is optionally carried out at a temperature between 60° C. and 80° C. in order to obtain sufficient drying effect and not to damage the recording medium.

In one embodiment, the heating time may be 10 seconds or more and 10 minutes or less, and optionally, 1 minute or more and 2 minutes or less, from the viewpoint of obtaining sufficient drying effect and not damaging the recording medium.

Here, embodiments of the printing device of the present disclosure used in the printing method of the present disclosure will be described in detail with reference to the drawings. In each drawing, the same components are indicated by the same reference numerals and overlapping descriptions may be omitted. Further, the number, position, shape, etc. of the following components are not limited to the present embodiment, and are optimized to the number, position, shape, etc. preferable for practicing the present invention.

FIG. 1 is a schematic diagram showing an example of a printing device according to one embodiment of the present disclosure used in the printing process of the present disclosure. The ink applying step and the primer applying step according to the printing method of the present disclosure may be performed by the same printing device or may be performed by a separate printing devices.

The printing device 100 of FIG. 1 may include a primer applying unit 110, an ink applying unit 120, a post-processing fluid applying unit 130, a drying unit 140, and a conveying unit 150. The primer applying unit 110 provides a primer to the recording medium M. The primer applying unit 110, the post-processing fluid applying unit 130, the drying unit 140, and the conveying unit 150 may be omitted.

As the method of applying a primer, there is no particular limitation, and the method can be selected according to the purpose, but the inkjet printing method is preferred. The primer applying unit 110 may be omitted because the primer may be manually applied to the recording medium by a bar-coating method, etc. in advance and then printed using a printing device.

The recording medium M used for recording is not particularly limited and may be appropriately selected depending on the purpose. Examples of the recording medium M include plain paper, glossy paper, special paper, corrugated board, cloth, film, OHP sheet, and general-purpose printing paper.

It should be noted that the present disclosure is particularly effective in a non-permeable recording medium in which beading is likely to occur.

In the present disclosure, a non-permeable recording medium means a recording medium having a surface with low water permeability and low absorbency, including a material with numerous cavities that do not open to the outside. More quantitatively, a non-permeable recording medium means a recording medium having a water absorption of 10 $mL/m^2$ or less from the start of contact to 30 $msec^{1/2}$ by the Bristow method.

Examples of the non-permeable recording medium include a vinyl chloride resin film, a polyethylene terephthalate (PET) film, polypropylene, polyethylene, polycarbonate film, nylon film, or the like.

The ink applying unit 120 applies ink to the surface of the recording medium M to which the primer is applied.

For example, a known ink jet head may be used as the ink applying unit 120.

The ink applying unit 120 may be an inkjet head for discharging ink of any color, for example, an ink jet head for discharging ink of Y (yellow), M (magenta), C (cyan), K (black), and W (white) color as necessary.

The primer may be discharged from a portion of the head discharging ink. In this case, the primer applying unit 110 may be omitted.

The post-processing fluid applying unit 130 may apply the post-processing fluid to the ink-applied area of the surface on which ink is applied to the recording medium M. For example, a sprayer or roller or the like may be used in addition to the ink jet head. The post-processing solution adding unit 130 may be omitted.

The method of applying the post-processing fluid is not particularly limited and may be selected according to the purpose, for example, inkjet printing method, roller coating method, blade coating method, gravure coating method, gravure offset coating method, bar coating method, roll coating method, knife coating method, air knife coating method, comma coating method, U-comma coating method, AKKU coating method, smoothing coating method, microgravure coating method, reverse roll coating method, 4 to 5 roll coating method, dip coating method, curtain coating method, slide coating method, die coating method, or the like.

The drying unit 140 dries the recording medium M to which the post-treatment fluid is applied with warm air. The drying unit 140 may be omitted when a post-processing solution applying unit is omitted.

The drying unit 140 may heat and dry the recording medium M to which the post-treatment solution is applied using infrared, microwave, roll heater, or the like instead of the hot air. The recording medium M to which the post-treatment solution may be naturally dried without operating the drying unit 140.

The transfer unit 150 conveys the recording medium M. If it is possible to convey the recording medium M, the conveying unit 150 is not particularly limited, and can be appropriately selected depending on the purpose, for example, a conveying belt, a platen, or the like.

The printing device 100 may further include a fixing unit for heating and fixing an image formed on the recording medium M. The fixing unit is not particularly limited, and can be appropriately selected according to the purpose. For example, the fixing roller is included.

When a desktop printer is used as a printing device, an embodiment of a primer applying unit and a post-processing fluid applying unit includes a liquid container having a primer or a post-processing liquid and a liquid discharge head, and discharging the primer or post-processing liquid in an ink jet manner, similar to the case of inks such as black (K), cyan (C), magenta (M), yellow (Y), and white (W).

In addition, in the term of the present disclosure, the image forming, recording, printing, printing, or the like are all synonymous.

Recording media, media shall all be synonymous.

EXAMPLES

Hereinafter, examples of the present disclosure will be described, but the present disclosure is not limited in any way to these examples.

Synthesis Example 1

<Synthesis of Resin A>

To a 4-mouth flask equipped with a stirrer, a reflux condenser, a thermometer, and a nitrogen blow-in tube, 35 mass parts of neopentyl glycol, 26 mass parts of 1,6-hexanediol, 80 mass parts of phthalic acid, 3 mass parts of N-methyldiethanolamine, 215 mass parts of hexamethylene diisocyanate, 31 mass parts of isophorone diisocyanate, and 260 mass parts of methyl ethyl ketone were added, and reacted at 75° C. for 4 hours to obtain a methyl ethyl ketone solution comprising urethane prepolymer. The resulting methyl ethyl ketone solution comprising urethane prepolymer was then cooled to 45° C. and quaternized by adding 34.9 mass parts of dimethyl sulfate. Subsequently, 1,760 mass parts of water was gradually added and the methyl ethyl ketone solution is emulsified and dispersed using a homogenizer, and the resulting emulsion dispersion liquid was evaporated by reducing the pressure at 50° C. to obtain an aqueous dispersion liquid of resin A with a non-volatile fraction of 25%.

Synthesis Example 2

<Synthesis of Resin B>

To a 4-mouth flask equipped with a stirrer, a reflux condenser, a thermometer, and a nitrogen blower, 126 mass parts of 1,6-hexanediol, 33 mass parts of N-methyldiethanolamine, 231 mass parts of hexamethylene diisocyanate, and 260 mass parts of methyl ethyl ketone were added and reacted at 75° C. for 4 hours to obtain a solution of methyl ethyl ketone comprising urethane prepolymer.

The solution was then cooled to 45° C. and quaternized by adding 34.9 mass parts of dimethyl sulfate.

Subsequently, 1760 mass parts of water was gradually added and the emulsified and dispersed using a homogenizer, and the emulsion dispersion was evaporated by reducing the pressure at 50° C. to obtain an aqueous dispersion liquid of resin B having a non-volatile fraction of 25%.

Synthesis Example 3

<Synthesis of Resin C>

To a four-mouth flask equipped with a stirrer, a reflux condenser, a thermometer, and a nitrogen blower, 40 parts by weight of neopentyl glycol, 40 parts by weight of 1,6-hexanediol, 46 parts by weight of phthalic acid, 33 parts by weight of N-methyldiethanolamine, 200 parts by weight of hexamethylene diisocyanate, 31 parts by weight of isophorone diisocyanate, and 260 parts by weight of methyl ethyl ketone were added and reacted at 75° C. for 15 hours to obtain a solution of methyl ethyl ketone comprising urethane prepolymer.

The solution was then cooled to 45° C. and quaternized by adding 34.9 parts by mass of dimethyl sulfate. Subsequently, 1,760 parts by mass of water was gradually added and emulsified and dispersed using a homogenizer, and the emulsion dispersion liquid was evaporated by reducing the pressure at 50° C. to obtain an aqueous dispersion liquid of resin C with a non-volatile fraction of 25%.

Examples 1-20 and Comparative Examples 1-9

<Preparation of Primer>

The ingredients and contents listed in Tables 1-1 to 1-3 and Tables 2-1 to 2-2 were mixed and stirred, and the resulting mixture was filtered through a filter (manufactured by Sartorius, Inc., Mini-Salt) with an average pore size of 10 μm to prepare Primers 1 to 29 of Examples 1 to 20 and Comparative Examples 1 to 9. The content of each primer component in Tables 1-1 to 1-3 and 2-1 to 2-2 is in mass %, and the content of resin (Hydrane CP-7050, Super Flex 126, Super Flex 620, Movinyl 6940, Resin A to C) is in solid equivalents.

The surface free energy, break energy, and break elongation were then measured for each of the resulting primers as follows. The results are shown in Tables 1-1 to 2-2.

<Measurement of Surface Free Energy>

The obtained primers and polyvinyl chloride (GIY-11Z5, manufactured by Lintec, Inc.) as the recording medium were used, and the contact angle was measured with a FAMAS automatic contact angle meter (manufactured by Kyowa Interface Chemical Co., Ltd., DMO-501) at 25° C., and a Zisman plot was prepared to determine the surface tension γc (critical surface tension) at cos θ=1 (θ=0), that is, the surface free energy (mJ/m2).

<Measurement of Breaking Energy and Breaking Elongation>

The resulting 6 g of each primer was placed in a Teflon® petri dish with a diameter of 50 mm and dried in a hot-air circulation-type thermostat at 40° C. for 1 day, and then dried in a hot-air circulation-type thermostat at 70° C. for 3 days. The resulting dry solid film was cut into the size of 5 mm×50 mm with a cutter, and a tensile test was conducted under the following conditions to determine the breaking energy and breaking elongation.

Conditions

Device: Autograph AG-10N manufactured by Shimadzu Corporation

Load cell: 5 kN

Tensile speed: 150 mm/min.

Distance between chucks: 4 mm

Sample width: 5 mm

TABLE 1-1

| | Examples | | | | | | |
|---|---|---|---|---|---|---|---|
| | 1 | 2 | 3 | 4 | 5 | 6 | 7 |
| Primer No. | 1 | 2 | 3 | 4 | 5 | 6 | 7 |
| Propylene glycol | 15 | 15 | 15 | 15 | 15 | 15 | 15 |
| 3-methoxy 3-methyl-1-butanol | 10 | 10 | 10 | 10 | 10 | 10 | 10 |
| Diethylene glycol diethyl ether | 5.5 | 5.5 | 5.5 | 5.5 | 30 | 30 | 30 |

TABLE 1-1-continued

| | Examples | | | | | | |
|---|---|---|---|---|---|---|---|
| | 1 | 2 | 3 | 4 | 5 | 6 | 7 |
| Diethylene glycol dimethyl ether | — | — | — | — | — | — | — |
| SAG503A | 0.5 | 0.5 | 0.5 | 0.5 | 0.5 | 0.5 | 0.5 |
| Proxcel LV | 0.01 | 0.01 | 0.01 | 0.01 | 0.01 | 0.01 | 0.01 |
| Magnesium acetate tetrahydrate | 0.25 | 10 | 0.25 | 10 | 0.25 | 10 | 0.25 |
| Magnesium nitrate hexahydrate. | — | — | — | — | — | — | — |
| Hydrane CP-7050 | 2 | 2 | 15 | 15 | 2 | 2 | 15 |
| Resin A | — | — | — | — | — | — | — |
| Ion exchange water | remaining amount | remaining amount | remaining amount | remaining amount | remaining amount | remaining amount | remaining amount |
| Total (wt %) | 100 | 100 | 100 | 100 | 100 | 100 | 100 |
| Surface free energy (mJ/m$^2$) | 40 | 40 | 40 | 40 | 30 | 30 | 30 |
| breaking elongation (%) | 750 | 750 | 750 | 750 | 750 | 750 | 750 |
| breaking energy (mJ) | 500 | 500 | 500 | 500 | 500 | 500 | 500 |

TABLE 1-2

| | Examples | | | | | | |
|---|---|---|---|---|---|---|---|
| | 8 | 9 | 10 | 11 | 12 | 13 | 14 |
| Primer No. | 8 | 9 | 10 | 11 | 12 | 13 | 14 |
| Propylene glycol | 15 | 15 | 15 | 15 | 15 | 15 | 15 |
| 3-methoxy 3-methyl-1-butanol | 10 | 10 | 10 | 10 | 10 | 10 | 10 |
| Diethylene glycol diethyl ether | 30 | 4.5 | 30.5 | — | 14.5 | 5.5 | 5.5 |
| Diethylene glycol dimethyl ether | — | — | — | 5 | — | — | — |
| SAG503A | 0.5 | 0.5 | 0.5 | 0.5 | 0.5 | 0.5 | 0.5 |
| Proxcel LV | 0.01 | 0.01 | 0.01 | 0.01 | 0.01 | 0.01 | 0.01 |
| Magnesium acetate tetrahydrate | 10 | 0.25 | 0.25 | 0.25 | 0.25 | — | 0.25 |
| Magnesium nitrate hexahydrate. | — | — | — | — | — | 0.25 | — |
| Hydrane CP-7050 | 15 | 12 | 12 | 12 | 12 | 12 | 1.5 |
| Resin A | — | — | — | — | — | — | — |
| Ion exchange water | remaining amount | remaining amount | remaining amount | remaining amount | remaining amount | remaining amount | remaining amount |
| Total (wt %) | 100 | 100 | 100 | 100 | 100 | 100 | 100 |
| Surface free energy (mJ/m$^2$) | 30 | 50 | 29 | 42 | 35 | 40 | 40 |
| Breaking elongation (%) | 750 | 750 | 750 | 750 | 750 | 750 | 750 |
| Breaking energy (mJ) | 500 | 500 | 500 | 500 | 500 | 500 | 500 |

TABLE 1-3

| | Examples | | | | | |
|---|---|---|---|---|---|---|
| | 15 | 16 | 17 | 18 | 19 | 20 |
| Primer No. | 15 | 16 | 17 | 18 | 19 | 20 |
| Propylene glycol | 15 | 15 | 15 | 15 | 15 | 15 |
| 3-methoxy 3-methyl-1-butanol | 10 | 10 | 10 | 10 | 10 | 10 |
| Diethylene glycol diethyl ether | 5.5 | 5.5 | 5.5 | 5.5 | 5.5 | 5.5 |
| Diethylene glycol dimethyl ether | — | — | — | — | — | — |
| SAG503A | 0.5 | 0.5 | 0.5 | 0.24 | 3.6 | 0.5 |
| Proxcel LV | 0.01 | 0.01 | 0.01 | 0.01 | 0.01 | 0.01 |

TABLE 1-3-continued

| | Examples | | | | | |
|---|---|---|---|---|---|---|
| | 15 | 16 | 17 | 18 | 19 | 20 |
| Magnesium acetate tetrahydrate | 0.25 | 0.1 | 10.5 | 0.25 | 0.25 | 0.25 |
| Magnesium nitrate hexahydrate. | — | — | — | — | — | — |
| Hydrane CP-7050 | 15.5 | 12 | 12 | 12 | 12 | — |
| Resin A | — | — | — | — | — | 12 |
| Ion exchange water | remaining amount | remaining amount | remaining amount | remaining amount | remaining amount | remaining amount |
| Total (wt %) | 100 | 100 | 100 | 100 | 100 | 100 |
| Surface free energy (mJ/m$^2$) | 40 | 40 | 40 | 50 | 20 | 50 |
| breaking elongation (%) | 750 | 750 | 750 | 750 | 750 | 1000 |
| breaking energy (mJ) | 500 | 500 | 500 | 500 | 500 | 500 |

Details of each ingredient in Tables 1-1 to 1-3 are as follows.

SAG503A (siloxane-based surfactant, HLB value=11; manufactured by Nissin Chemical Industry Co., Ltd.)

Proxcel LV (preservative, made by Avicia)

Hydrane CP-7050 (Cationic polyurethane particles, non-volatile fraction 30%, manufactured by DIC Corporation)

TABLE 2-1

| | Comparative Examples | | | | | |
|---|---|---|---|---|---|---|
| | 1 | 2 | 3 | 4 | 5 | 6 |
| Primer No. | 21 | 22 | 23 | 24 | 25 | 26 |
| Propylene glycol | 15 | 15 | 15 | 15 | 15 | 15 |
| 3-methoxy 3-methyl-1-butanol | 10 | 10 | 10 | 10 | 10 | 10 |
| Diethylene glycol diethyl ether | — | — | — | 5.5 | 5.5 | 5.5 |
| Triethylene glycol monobutyl ether | 5.5 | — | — | — | — | — |
| Ethyl acetate | — | 5.5 | — | — | — | — |
| γ-butyrolactone | — | — | 5.5 | — | — | — |
| SAG503A | 0.5 | 0.5 | 0.5 | 0.5 | 0.5 | 0.5 |
| Proxcel LV | 0.01 | 0.01 | 0.01 | 0.01 | 0.01 | 0.01 |
| Magnesium acetate tetrahydrate | 0.25 | 0.25 | 0.25 | 0.25 | — | 0.25 |
| Sodium acetate | — | — | — | — | 0.25 | — |
| Hydrane CP-7050 | 2 | 2 | 2 | — | 2 | — |
| Super Flex 126 | — | — | — | 2 | — | — |
| Super Flex 620 | — | — | — | — | — | 2 |
| Resin B | — | — | — | — | — | — |
| Movinyl 6940 | — | — | — | — | — | — |
| Resin C | — | — | — | — | — | — |
| Ion exchange water | remaining amount | remaining amount | remaining amount | remaining amount | remaining amount | remaining amount |
| Total (wt %) | 100 | 100 | 100 | 100 | 100 | 100 |
| Surface free energy (mJ/m$^2$) | 55 | 60 | 55 | 42 | 40 | 40 |
| breaking elongation (%) | 750 | 750 | 750 | 87 | 750 | 5 |
| breaking energy (mJ) | 500 | 500 | 500 | 100 | 500 | 50 |

TABLE 2-2

| | Comparative Examples | | |
|---|---|---|---|
| | 7 | 8 | 9 |
| Primer No. | 27 | 28 | 29 |
| Propylene glycol | 15 | 15 | 15 |
| 3-methoxy 3-methyl-1-butanol | 10 | 10 | 10 |
| Diethylene glycol diethyl ether | 5.5 | 5.5 | 5.5 |

TABLE 2-2-continued

| | Comparative Examples | | |
|---|---|---|---|
| | 7 | 8 | 9 |
| Triethylene glycol monobutyl ether | — | — | — |

TABLE 2-2-continued

| | Comparative Examples | | |
|---|---|---|---|
| | 7 | 8 | 9 |
| Ethyl acetate | — | — | — |
| Y -butyrolactone | — | — | — |
| SAG503A | 0.5 | 0.5 | 0.5 |
| Proxcel LV | 0.01 | 0.01 | 0.01 |

TABLE 2-2-continued

| | Comparative Examples | | |
|---|---|---|---|
| | 7 | 8 | 9 |
| Magnesium acetate tetrahydrate | 0.25 | 0.25 | 0.25 |
| Sodium acetate | — | — | — |
| Hydrane CP-7050 | — | — | — |
| Super Flex 126 | — | — | — |
| Super Flex 620 | — | — | — |
| Resin B | 2 | — | — |
| Movinyl 6940 | — | 2 | — |
| Resin C | — | — | 2 |
| Super Flex 650 | — | — | — |
| Ion exchange water | remaining amount | remaining amount | remaining amount |
| Total (wt %) | 100 | 100 | 100 |
| Surface free energy (mJ/m$^2$) | 40 | 40 | 40 |
| breaking elongation (%) | 2700 | 880 | 500 |
| breaking energy (mJ) | 800 | 16 | 1300 |

The details of each ingredient in Table 2-1 and Table 2-2 are as follows.

Hydrane CP-7050 (Cationic polyurethane particles, non-volatile fraction 30%, manufactured by DIC Corporation)

Super Flex 126 (anionic polyurethane particles, non-volatile fraction 30%, manufactured by Daiichi Kogyo Co., Ltd.)

Super Flex 620 (Cationic polyurethane particles, non-volatile fraction 30%, Daiichi Kogyo Co., Ltd.)

Movinyl 6940 (Cationic acrylic particles, non-volatile fraction 30%, Daiichi Kogyo Co., Ltd.)

Super Flex 650 (Cationic polyurethane particles, non-volatile content 26%, Daiichi Kogyo Co., Ltd.)

Preparation of Pigment Dispersion Example 1

<Preparation of Black Pigment Dispersions>

100 g of SRF-LS (carbon black, manufactured by Tokai Carbon Co., Ltd.) was added to 3,000 mL of 2.5 N (specified) sodium hypochlorite solution, stirred at a temperature of 60° C. at a rate of 300 rpm, oxidized for 10 hours, and a reaction liquid containing carbon black on which a carboxylic acid group was added to the surface was obtained. The reaction liquid was filtered and the filtered carbon black was neutralized with sodium hydroxide solution and ultrafiltration to obtain the pigment dispersion.

Next, the resulting pigment dispersion was ultrafiltered through a dialysis membrane using ion-exchange water, and then ultrasonic dispersion was performed to obtain a black pigment dispersion having a volume average particle size of 100 nm, wherein the pigment solid content was concentrated to 20 wt %.

Ink Manufacturing Example 1

<Making Black Ink>

Black ink 1 was prepared by mixing and agitating the ingredients and contents described in Table 3 and filtering the resulting mixture through a polypropylene filter with an average pore size of 0.2 μm. All of the content of each component of black ink in Table 3 are wt %, and the content of resin (Boncoat CP-6450) is the solids equivalent.

TABLE 3

| | Black ink 1 |
|---|---|
| Boncoat CP-6450 | 10 |
| Black pigment dispersions | 5 |
| Propylene glycol | 30 |
| Diethylene glycol monobutyl ether | 5 |
| FS-300 | 0.5 |
| Ion exchange water | remaining amount |
| Total (wt %) | 100 |

The details of each of the ingredients in Table 3 are as follows.

Boncoat CP-6450 (acrylic emulsion, DIC, solids concentration 40%)

FS-300 (fluorine-based surfactant, DuPont)

Examples 21-40 and Comparative Examples 10-18

<Forming Imaging>

The prepared primers 1-29 and black ink 1 for Examples 1-20 and Comparative Examples 1-9 were filled into an inkjet printer (device name: IPSiO GXe 5500, manufactured by Ricoh Co., Ltd.) in accordance with the combination shown in Tables 4-1 to 4-5.

Next, a solid image of the primer was printed on each recording medium shown in Tables 4-1 to 4-5 so that the amount of the primer attached was 4.2 g/m2.

Next, within 10 minutes after the solid image of the primer was printed, the solid image of black ink 1 was printed on the solid image of the primer, and the solid image of black ink 1 was dried at 80° C. for 3 minutes.

[Recording Medium]

Polyvinyl chloride (GIY-11Z5, manufactured by Lintec Corporation; hereinafter referred to as "PVC sheet")

Polyvinyl chloride plastic foam (KAPA, PLAST, 3A Composites, hereinafter referred to as "foamed plastic sheet")

Polycarbonate (PC-2151, Teijin Limited; hereinafter referred to as "polycarbonate film")

Styrene (made by WB tuck, Sekisui Plastics Co., Ltd., hereinafter referred to as "styrene board")

Polypropylene (made by Toray Industries, Ltd., and hereinafter referred to as "polypropylene sheet")

Acrylic (made by Acrylite TMS, Mitsubishi Chemical Corporation; hereinafter referred to as "Acrylic Board")

Polyethylene terephthalate (Toyobo Ester (™) film E3120, manufactured by Toyobo Co., Ltd., hereinafter referred to as "PET sheet")

Polyethylene Core Aluminum Composite Plate (manufactured by Alpolic, Inc., Mitsubishi Chemical Infrastructure Technologies, Inc., hereinafter referred to as "Aluminum Composite Plate")

Polyester (Lumiller, Inc., manufactured by Toray Industries, Inc., hereinafter referred to as "polyester sheet")

Next, fixability (beading resistance), glossiness, and adhesion were evaluated for each image obtained as follows. The results are shown in Tables 4-1 to 4-5.

<Fixability (Beading Resistance)>

The presence or absence of beading (recording irregularities) of the solid image of the primer formed on the "PVC sheet" and the ink image on the primer were visually observed, and fixability (beading resistance) was evaluated based on the following evaluation criteria. It is preferable in practical use that the evaluation is B or above.

[Evaluation Standards]

A: Very good (no beading at all)

B: Good (slight beading was observed)

C: Normal (beading has occurred)

<Adhesion>

For the solid image formed on each recording medium of “PVC sheet,” “foamed plastic,” “polycarbonate film,” “styrene board,” “polypropylene sheet,” “acrylic board,” “PET sheet,” “aluminum sheet,” and “polyester sheet,” a grid peel test was performed using a fabric adhesive tape (Nichiban Corporation, 123 LW-50). The number of remaining grids in 100 test grids was counted, and the “adhesion” to the recording medium was evaluated based on the following evaluation criteria. It is preferable in practical use that the aforementioned evaluation is B or above.

[Evaluation Standards]

A: Number of remaining grids is 90 or more

B: Number of remaining grids is 70 or more but less than 90

C: Number of remaining grids is less than 70

<Glossiness>

The gloss level at 60° of the solid image formed on the PVC sheet was measured four times with a gloss meter (BYK Gardener, 4501) to determine the average value of 60° gloss, and the “glossiness” was evaluated based on the following evaluation criteria. It is preferable in practical use that the evaluation is B or above.

[Evaluation Standards]

A: The average value of 60° gloss is 90 or more

B: The average value of 60° gloss is 80 or more and less than 90.

C: The average value of 60° gloss is less than 80

TABLE 4-1

| | | Examples | | | | | | |
|---|---|---|---|---|---|---|---|---|
| | | 21 | 22 | 23 | 24 | 25 | 26 | 27 |
| Primer No. | | 1 | 2 | 3 | 4 | 5 | 6 | 7 |
| Black ink No. | | 1 | 1 | 1 | 1 | 1 | 1 | 1 |
| Evaluation item | Recording Medium | Evaluation result | | | | | | |
| beading resistance of the ink image on the primer | PVC sheet | A | A | A | A | A | A | A |
| beading resistance of the solid image of the primer | PVC sheet | A | A | A | A | A | A | A |
| glossiness | PVC sheet | A | A | A | A | A | A | A |
| adhesion | PVC sheet | A | A | A | A | A | A | A |
| | Foamed plastic sheet | A | A | A | A | A | A | A |
| | Polycarbonate film | A | A | A | A | A | A | A |
| | Styrene board | A | A | A | A | A | A | A |
| | Polypropylene sheet | A | A | A | A | A | A | A |
| | Acrylic Board | A | A | A | A | A | A | A |
| | PET sheet | A | A | A | A | A | A | A |
| | Aluminum Composite Plate | A | A | A | A | A | A | A |
| | Polyester sheet | A | A | A | A | A | A | A |

TABLE 4-2

| | | Examples | | | | | | |
|---|---|---|---|---|---|---|---|---|
| | | 28 | 29 | 30 | 31 | 32 | 33 | 34 |
| Primer No. | | 8 | 9 | 10 | 11 | 12 | 13 | 14 |
| Black ink No. | | 1 | 1 | 1 | 1 | 1 | 1 | 1 |
| Evaluation item | Recording Medium | Evaluation result | | | | | | |
| beading resistance of the ink image on the primer | PVC sheet | A | A | A | A | A | A | A |
| beading resistance of the solid image of the primer | PVC sheet | A | A | A | A | A | A | A |
| glossiness | PVC sheet | A | A | A | B | B | B | A |
| adhesion | PVC sheet | A | B | B | A | B | B | B |
| | Foamed plastic sheet | A | A | A | A | A | A | A |
| | Polycarbonate film | A | A | A | A | A | A | A |
| | Styrene board | A | A | A | A | A | A | A |
| | Polypropylene sheet | A | A | A | A | A | A | A |
| | Acrylic Board | A | A | A | A | A | A | A |
| | PET sheet | A | A | A | A | A | A | A |
| | Aluminum Composite Plate | A | A | A | A | A | A | A |
| | Polyester sheet | A | A | A | A | A | A | A |

TABLE 4-3

| | | Examples | | | | | |
|---|---|---|---|---|---|---|---|
| | | 35 | 36 | 37 | 38 | 39 | 40 |
| Primer No. | | 15 | 16 | 17 | 18 | 19 | 20 |
| Black ink No. | | 1 | 1 | 1 | 1 | 1 | 1 |
| Evaluation item | Recording Medium | Evaluation result | | | | | |
| beading resistance of the ink image on the primer | PVC sheet | A | A | A | A | B | A |
| beading resistance of the solid image of the primer | PVC sheet | A | A | A | A | B | A |
| glossiness | PVC sheet | B | A | B | A | A | A |
| adhesion | PVC sheet | A | B | A | B | A | A |
| | Foamed plastic sheet | A | A | A | A | A | A |
| | Polycarbonate film | A | A | A | B | A | A |
| | Styrene board | A | A | A | B | A | A |
| | Polypropylene sheet | A | A | A | A | A | B |
| | Acrylic Board | A | A | A | B | A | A |
| | PET sheet | A | A | A | A | A | A |
| | Aluminum Composite Plate | A | A | A | B | A | A |
| | Polyester sheet | A | A | A | B | A | A |

TABLE 4-4

| | Comparative Examples | | | | | |
|---|---|---|---|---|---|---|
| | 10 | 11 | 12 | 13 | 14 | 15 |
| Primer No. | 21 | 22 | 23 | 24 | 25 | 26 |
| Black ink No. | 1 | 1 | 1 | 1 | 1 | 1 |

TABLE 4-4-continued

| Evaluation item | Recording Medium | Evaluation result | | | | | |
|---|---|---|---|---|---|---|---|
| beading resistance of the ink image on the primer | PVC sheet | B | C | C | C | C | B |
| beading resistance of the solid image of the primer | PVC sheet | B | C | C | C | C | B |
| glossiness | PVC sheet | B | B | B | C | C | B |
| adhesion | PVC sheet | B | B | C | C | C | B |
| | foamed plastic sheet | B | B | B | C | C | B |
| | polycarbonate film | B | B | B | C | C | B |
| | styrene board | B | B | B | C | C | C |
| | polypropylene sheet | B | B | B | C | C | B |
| | Acrylic Board | B | B | B | C | C | C |
| | PET sheet | B | B | B | C | C | B |
| | Aluminum Composite Plate | B | B | B | C | C | C |
| | polyester sheet | B | B | B | C | C | B |

TABLE 4-5

| | | Comparative Examples | | |
|---|---|---|---|---|
| | | 16 | 17 | 18 |
| Primer No. | | 27 | 28 | 29 |
| Black ink No. | | 1 | 1 | 1 |
| Evaluation item | Recording Medium | Evaluation result | | |
| beading resistance of the ink image on the primer | PVC sheet | B | B | B |
| beading resistance of the solid image of the primer | PVC sheet | B | B | B |
| glossiness | PVC sheet | B | B | B |
| adhesion | PVC sheet | B | B | B |
| | foamed plastic sheet | B | B | B |
| | polycarbonate film | B | B | B |
| | styrene board | B | C | C |
| | polypropylene sheet | C | C | C |
| | Acrylic Board | B | B | B |
| | PET sheet | C | B | C |
| | Aluminum Composite Plate | B | B | B |
| | polyester sheet | B | B | B |

It can be seen that Examples 21 to 28, which used primers 1 to 8 of Examples 1 to 8, produce images with excellent fixability and high glossiness and adhesion.

Example 29 using the primer 9 of Example 9, which the content of diethylene glycol alkyl ether is less than 5 wt, resulted in less glossiness and less adhesive compared to Examples 21 to 28.

Example 30 using the primer 10 of Example 10, which the content of the diethylene glycol alkyl ether content is greater than 30 wt %, resulted in less adhesion compared to Examples 21 to 28.

Example 31 using the primer 11 of Example 11, which uses diethylene glycol dimethyl ether as the diethylene glycol alkyl ether compound, resulted in less glossiness compared to Examples 21 to 28.

Example 32 using the primer 12 of Example 12, which the content of diethylene glycol diethyl ether is less than 15 wt %, resulted in less glossiness and less adhesive compared to Examples 21-28.

Example 33 using the primer 13 of Example 13, which uses magnesium nitrate as the polyvalent metal salt, resulted in less glossiness and less adhesion compared to Examples 21 to 28.

Example 34 using the primer 14 of Example 14, which the content of the cationic resin is less than 2 wt % resulting in less adhesion compared to Examples 21-28.

Example 35 using the primer 15 of Example 15, which the content of the cationic resin is greater than 15 wt %, resulted in less glossiness compared to Examples 21 to 28.

Example 36 using the primer 16 of Example 16, which the content of magnesium acetate is less than 0.25 wt %, resulted in less adhesion compared to Examples 21-28.

Example 37 using the primer 17 of Example 17, which the content of magnesium acetate is more than 10% by weight, resulted in less glossiness compared to Examples 21-28.

In Example 38 using the primer 18 of Example 18, which the content of the surfactant is less than 5% by weight relative to the cationic resin, resulted in less adhesion compared to Examples 21 to 28.

In Example 39 using the primer 19 of Example 19, which the content of the surfactant is greater than 20 wt % relative to the cationic resin, resulted in less fixability compared to Examples 21 to 28.

Example 40 using the primer 20 of Example 20, which the surface free energy of the primer is greater than 45 mJ/m2, resulted in less adhesion compared to Examples 21-28.

Comparative Example 10 using the primer 21 of Comparative Example 1, which does not include diethylene glycol alkyl ether compound but include triethylene glycol monobutyl ether instead of the diethylene glycol alkyl ether compound, resulted in less fixability compared to the examples.

Comparative Example 11 using the primer 22 of Comparative Example 2, which does not include the diethylene glycol alkyl ether compound but includes ethyl acetate instead of the diethylene glycol alkyl ether compound, resulted in less fixability compared to the examples.

Comparative Example 12 using the primer 23 of Comparative Example 3, which does not include the diethylene glycol alkyl ether compound but includes γ-butyrolactone instead of diethylene glycol alkyl ether compound, resulted in less fixability and adhesion compared to the examples.

Comparative Example 13 using the primer 24 of Comparative Example 4, which does not include cationic resin but included anionic resin, Super Flex 126, instead of cationic resin, resulted in less fixability, glossiness, and adhesion when compared to the examples.

Comparative Example 14 using the primer 25 of Comparative Example 5, which does not include polyvalent metal salt and includes sodium acetate which is monovalent metal salt instead of a polyvalent metal salt, resulted in less fixability, glossiness, and adhesion compared to the examples.

In Comparative Example 15, the primer 26 of Comparative Example 6, which uses Super Flex 620 as the cationic resin, resulted in the fact that the breaking elongation of less than 500% and poor fixability and adhesion compared to the examples.

Comparative Example 16 using the primer 27 of Comparative Example 7, which uses a resin having a breaking elongation of 2,500% or more, resulted in less fixability and adhesion compared to the examples.

Comparative Example 17 using the primer 28 of Comparative Example 8, which uses a resin having a breaking energy of less than 20 mJ, resulted in less fixability and adhesion compared to the examples.

Comparative Example 18 using the primer 29 of Comparative Example 9, which uses a resin having a breaking energy of greater than 1,000 mJ, resulted in less fixability and adhesion compared to the examples.

What is claimed is:

1. A primer comprising water, a cationic urethane resin, a polyvalent metal salt, and a diethylene glycol alkyl ether compound, wherein a dry solid film formed from the primer has a breaking energy of 20 mJ or more and 1,000 mJ or less and a breaking elongation of 500% or more and 2,500% or less, which are measured by a tensile tester having a tensile speed of 150 mm/min.

2. The primer according to claim 1, wherein a content of the diethylene glycol alkyl ether compound in the primer is 5 wt % or more and 30 wt % or less.

3. The primer according to claim 1, wherein the diethylene glycol alkyl ether compound is diethylene glycol diethyl ether.

4. The primer according to claim 1, wherein the polyvalent metal salt comprises magnesium acetate.

5. The primer according to claim 1, wherein a content of the polyvalent metal salt in the primer is 0.25 wt % or more and 10 wt % or less.

6. The primer according to claim 1, wherein a content of the cationic urethane resin in the primer is 2 wt % or more and 15 wt % or less.

7. The primer according to claim 1, further comprising a surfactant, wherein a mass ratio of the surfactant to the cationic urethane resin (surfactant:cationic resin) is from 1:4 to 1:20.

8. The primer according to claim 1, wherein surface free energy γ of the primer under conditions of 25° C. is 45 mJ/m2 or less.

9. A printing set comprising the primer according to claim 1 and an ink comprising a colorant and an organic solvent.

10. A printing method, comprising:

a primer applying step to provide the primer according to claim 1 on a recording medium; and an ink applying step to apply an ink containing a colorant and an organic solvent on the recording medium on which the primer is applied.

11. The printing method according to claim 10, wherein the recording medium is a non-permeable recording medium.

12. A printing device, comprising a primer applier to provide the primer according to claim 1 on a recording medium; and an ink applier to apply an ink containing a colorant and an organic solvent on the recording medium on which the primer is applied.

13. The printing device according to claim 12, wherein the recording medium is a non-permeable recording medium.

* * * * *